Dec. 24, 1935.  E. V. TWOSE  2,025,184
DISTRIBUTOR FOR ARTIFICIAL MANURE, CORN, SEED AND THE LIKE
Filed Dec. 19, 1934  2 Sheets-Sheet 1
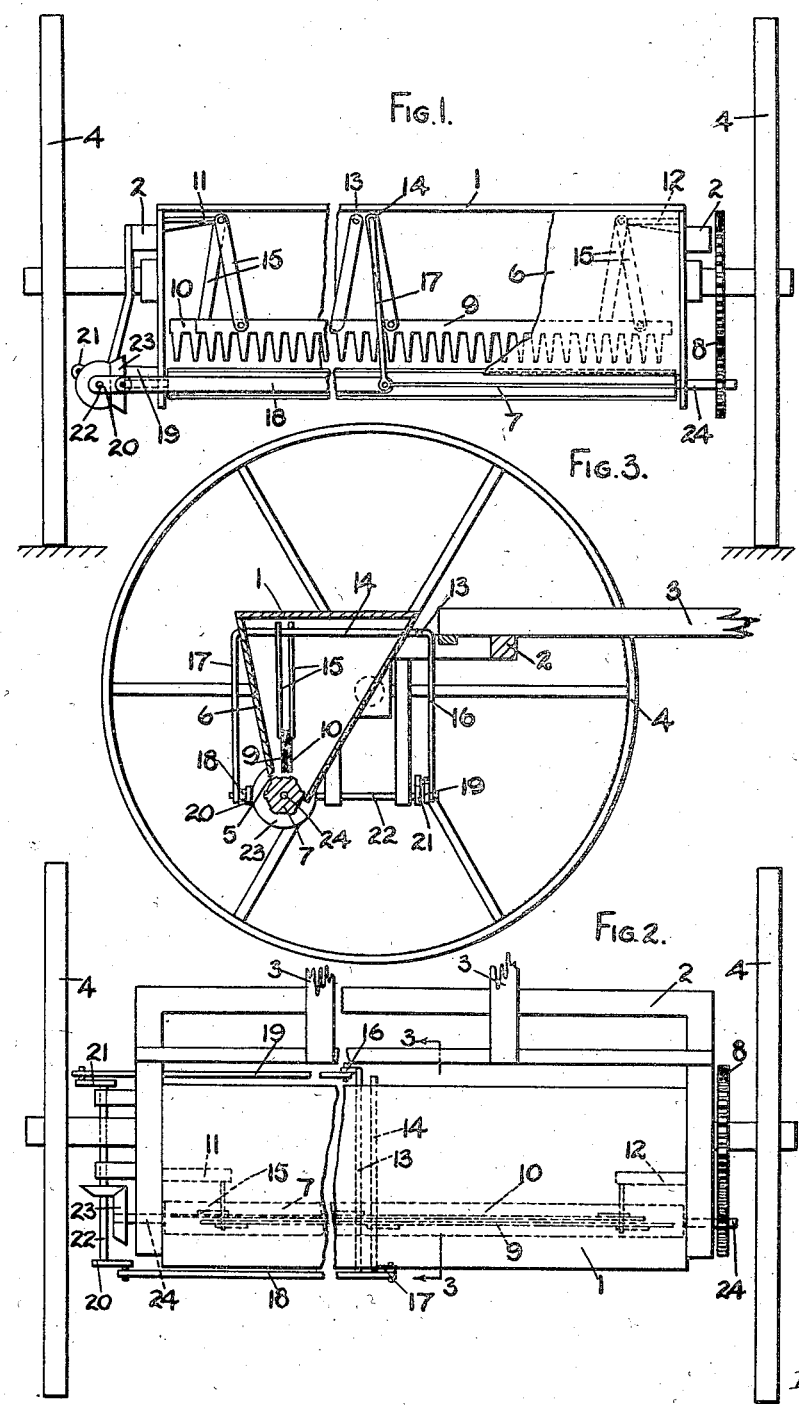
Inventor
Ernest V. Twose Dec. 24, 1935.  E. V. TWOSE  2,025,184
DISTRIBUTOR FOR ARTIFICIAL MANURE, CORN, SEED AND THE LIKE
Filed Dec. 19, 1934   2 Sheets-Sheet 2

Inventor.
Ernest V. Twose
By Cushman, Darby & Cushman
Attys

Patented Dec. 24, 1935

2,025,184

UNITED STATES PATENT OFFICE 2,025,184

DISTRIBUTOR FOR ARTIFICIAL MANURE, CORN, SEED, AND THE LIKE

Ernest Vickery Twose, Tiverton, England

Application December 19, 1934, Serial No. 758,331
In Great Britain May 4, 1934

4 Claims. (Cl. 221—120)

This invention is for improvements in or relating to distributors for use on farms in the distribution of artificial manure, corn, seed and the like.

The type of distributor to which the invention relates is the type which comprises a hopper for the material to be distributed disposed transversely of the machine and having at the bottom a discharge orifice extending along the length of the hopper in proximity to a discharge roller also extending along the length of the hopper parallel with the discharge orifice and adapted by rotation to direct the manure, corn or the like through the discharge orifice, this roller being generally driven through suitable gearing from one of the ground wheels of the machine and the discharge orifice usually being of adjustable width, for example by reason of one edge of the orifice being constituted by the edge of an adjustable slide or slides movable towards and away from the opposite edge of the orifice is constituted by the peripheral surface of the roller, and provided for this purpose with suitable adjusting gear in the form, for instance, of a hand operated screw or lever mounted upon the hopper and there being within the hopper in association with the discharge roller agitating means for preventing arching of the manure or the like in the neighbourhood of the roller and for breaking up lumps that may exist or form in the material.

The object of the invention is to provide an improvement in distributors of this type which will facilitate and ensure efficient action of the machine, more especially in cases where the material to be distributed is of a lumpy or otherwise clogging nature tending to interfere with the effectual action of the discharge roller.

According to the present invention, a mechanical distributor for artificial manure and the like comprises a trough hopper extending transversely of the machine, a discharge roller disposed along the bottom of the hopper, constituting as to approximately its upper half the bottom wall of the hopper and spaced at its periphery from the lower edge of one of the longitudinal walls thereof, so as to form with said edge a discharge slot at one side of the axis of the roller, and vertically disposed downwardly directed agitator prongs for the manure or the like, reciprocatable longitudinally of the hopper in proximity at their lower ends to the discharge roller, the prongs being arranged in opposite reciprocating sets which are disposed face to face in proximity to one another and in such a position immediately above the discharge roller as to intervene between the body at least of the manure or the like in the hopper and the discharge slot, the bulk of the manure or the like requiring thus to pass the prongs on its way to the slot.

Conveniently, there may be two sets of spaced prongs, in which case they may either both be reciprocatable or only one. Alternatively, there may be three sets of prongs, in which case, either all three of the sets may be reciprocatable or only the two on either side of the centre set, the latter set being stationary.

Advantageously, one or more of the sets of prongs may be arranged to be thrown out of action when they are not required. Alternatively, they may be removable bodily from place within the hopper. Any convenient arrangement to this end may be employed.

The agitator may be driven by the ground wheels of the machine, a suitable operative connection being provided between the agitator and the ground wheels for this purpose, or if the distributor is mounted upon a tractor, the agitator together with the discharge roller may be driven from the engine of the tractor.

The invention will now be further described with reference to the accompanying drawings, which illustrate by way of example one preferred embodiment, and in which:

Figure 1 is a rear elevation of the machine showing a part of the rear wall of the hopper broken away;

Figure 2 is a corresponding plan view,

Figure 3 is a longitudinal section through the machine on the section line 3—3 of Figure 2.

Like reference characters indicate like parts in the various figures, and for this reason Figures 4 to 7 will only be referred to hereinafter briefly.

Figure 4:
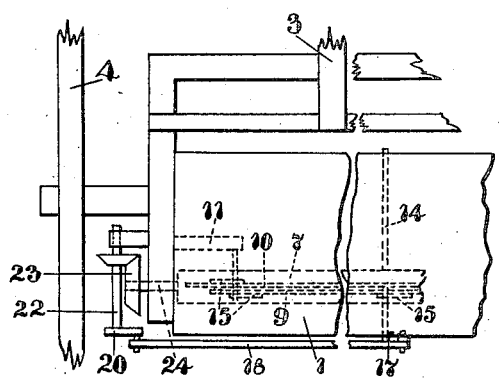
Figure 4 illustrates an arrangement with only one set of prongs movable.

Referring first to Figures 1 to 3, the machine comprises a hopper I of usual form mounted upon a frame 2 with draw bars 3 and ground wheels 4.

The hopper is of downwardly tapered cross-section and near the bottom is a discharge orifice 5 constituted by the space between the lower edge of the rear wall 6 of the hopper and the periphery of a discharge roller 7 bridging the otherwise open space along the bottom of the hopper between the forward and rear walls thereof. The said orifice 5 may if desired be of adjustable width as already described herein, and as usual the roller 7 is driven through the intermediary of gearing 8 from one of the ground wheels 4 of the machine. If the orifice is of adjustable width, the slide providing for the adjustment may advantageously be in two or more separately adjustable sections disposed end to end across the width of the machine.

Located in proximity to the discharge roller 7 and the orifice 5, as shown in Figure 2, are a pair of sets of spaced prongs 9, 10 respectively, both reciprocatable. These sets of prongs, each of which may carry say thirty-six teeth in the case of a hopper of about six feet in length, are positioned closely together, for example about one eighth of an inch apart, and the proportions of the individual prongs are preferably those illustrated in Figure 1. Thus, in the case again of a six foot hopper, the spacing of the prongs would be approximately two inches and the length of the prong from the upper edge of the bar carrying it would be about four and a half inches while the face widths at the top and bottom would be about three-quarters of an inch and three-eighths of an inch respectively. The thickness of the prong would be about one eighth of an inch. It will be realized, however, that these specific dimensions are given purely by way of example and that other dimensions may if desired be employed.

As stated, the two sets of prongs 9, 10 are both reciprocatable, and the arrangement is such that, while one set is moving in one direction the other is moving in the opposite direction. The arrangement is also such, preferably, that there is always one set of prongs moving; that is to say, at the moment when one set of prongs reaches the end of its stroke in one direction the other set is still moving to the end of its stroke in the opposite direction or alternatively has commenced its stroke in the reverse direction. It has been found that by this means the action of the prongs in the hopper is generally enhanced.

The two sets of prongs are hung in the hopper upon brackets 11, 12, at opposite sides respectively of the hopper interior near the top thereof and also upon longitudinal rock shafts 13, 14 located near the centre line of the machine and also at the top of the hopper interior, the sets of prongs being suspended from these brackets and rock shafts through the intermediary of links 15, depending therefrom.

These links 15 are pivotally connected at the bottom to the sets of prongs and those which depend from the brackets 11, 12 are pivotally connected thereto so as to be freely swingable in a vertical plane during the swing to and fro of the prongs. The centre link, however, depending from the rock shaft 13 (14), is rigidly connected to the shaft so as during the rocking thereof to oscillate in the vertical plane and thereby transmit the motion of the shaft to the set of prongs operatively connected therewith through the intermediary of the link.

As shown, the two rock shafts 13, 14 reach completely through the hopper and the forward end of shaft 13 and the rear end of shaft 14 are turned downwardly to form an operating lever 16 (17) for the shaft, the lower end of which is pivoted to the inner end of a connecting rod 18 (19) in turn pivoted at the outer end to a crank 20 (21) fast upon a longitudinal shaft 22 geared through bevel gearing 23 to the spindle 24 of the discharge roller 7, the arrangement, therefore, being such that as the machine travels along the ground and said discharge roller 7 revolves, the sets of prongs 9, 10 are continuously reciprocated in unison with the rotation of the roller, through the intermediary of the gearing 23, shaft 22, crank 20 (21), connecting rod 18 (19), lever 16 (17), rock shaft 13 (14) and centre link 15. Here again, however, any other suitable driving means for the sets of prongs may be employed.

It is found that the improved construction and arrangement of distributor provided in accordance with the present invention as described above is remarkably efficient in operation. The manure or the like is effectively prevented either from clogging the distributor slot or from arching in the hopper. The arching is prevented by the rising and falling movement of the oppositely reciprocating sets of prongs and the close disposition of said sets of prongs to one another, coupled with their particular position in the hopper (namely, the position in which they are disposed in the path to the discharge slot, of the bulk at least of the manure or the like in the hopper), enables the oppositely reciprocating sets of prongs to perform the dual function of not only breaking up the lumps in the manure or the like but also of sifting the broken up material so as more positively to prevent lumps in it from passing forward to the discharge slot where they would be prone to cause a clogging of the machine.

Referring now to Figures 4 to 7, Figure 4 shows as stated an arrangement where only one of the sets of prongs is movable, namely the forward set 10. Thus, of the two sets 9, 10 this set 10 alone is geared up to the ground wheels of the machine through the parts 15, 14, 17, 18, 20, 22, 23 etc.

Figure 5:
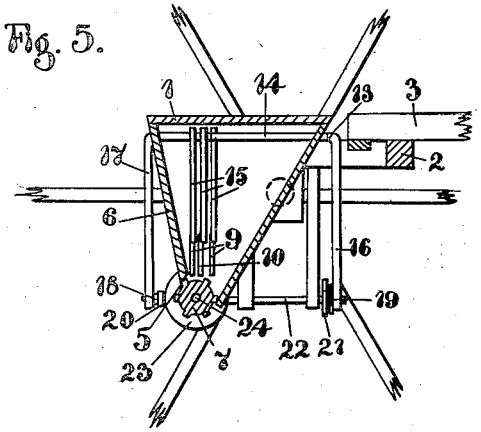
Figure 5 shows an arrangement with three sets of prongs.

In the arrangement according to Figure 5, there are three sets of reciprocatable prongs, a forward and a rear set, both marked 9, and a centre set marked 10. All three of the sets are reciprocatable, there being accordingly at each point of suspension three links 15, two of each, instead of only one, depend from one of the rock shafts 13, 14, the remaining link depending from the other rock shaft.

Figure 6:
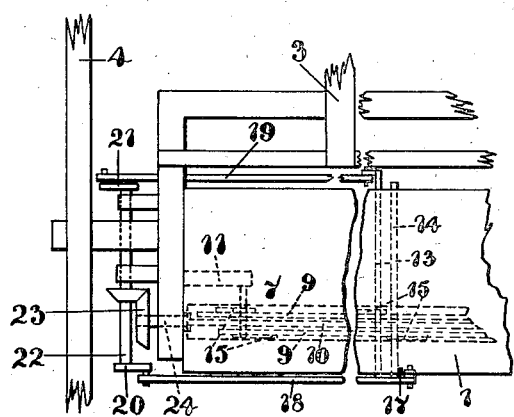
Figure 6 illustrates another arrangement of three sets of prongs, but in which only two sets are reciproctable either side of a centre set, which is not reciprocated.

Figure 6 also, as stated, illustrates an arrangement of three sets of prongs, but in this case the centre set 10 is stationary and the forward and rear sets 9 are respectively operated as, in the case of the arrangement shown in Figures 1 to 3, through the intermediary of the two rock shafts 14—15.

Figure 7:
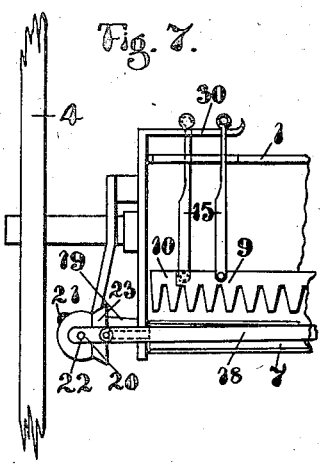
Figure 7 illustrates an arrangement in which there are two sets of prongs mounted to slide or roll to and fro along the hopper on rollers.

Finally, with regard to the arrangement shown in Figure 7, the two sets of prongs 9, 10 of this arrangement are respectively hung upon links 15 which in turn slidingly hang upon rails 30. It will be appreciated that such sliding links 15 are provided only at the ends of the sets of prongs, the said sets being suspended at the centre upon oscillating links with rock shafts (13, 14) as in the other arrangement.

What I claim and desire to secure by Letters Patent of the United States is:

1. In a mechanical distributor for artificial manure and the like, a trough hopper extending across the machine and having in it along the bottom a discharge slot, a discharge roller adjacent one edge of the discharge slot, closely spaced sets of downwardly directed prongs extending along the hopper parallel to one another and with the ends of the prongs in proximity to the